United States Patent [19]

Cottriall

[11] 4,320,419

[45] Mar. 16, 1982

[54] IMAGE REPRODUCTION EQUIPMENT

[75] Inventor: Peter F. Cottriall, London, England

[73] Assignee: Crosfield Electronics Limited, London, England

[21] Appl. No.: 173,411

[22] Filed: Jul. 29, 1980

[30] Foreign Application Priority Data

Jul. 30, 1979 [GB] United Kingdom ............... 26529/79

[51] Int. Cl.[3] ............................................. H04N 1/40

[52] U.S. Cl. ..................................... 358/258; 358/75; 358/263

[58] Field of Search .................. 358/263, 257, 258, 75

[56] References Cited

U.S. PATENT DOCUMENTS 4,151,562 4/1979 Tregay ............................... 358/263

4,255,766 3/1981 Matsuda ............................. 358/258

FOREIGN PATENT DOCUMENTS 1357615 6/1974 United Kingdom .

1407487 9/1975 United Kingdom .

2025725 1/1980 United Kingdom .

2026282 1/1980 United Kingdom .

*Primary Examiner*—Howard Britton

*Attorney, Agent, or Firm*—Kemon & Estabrook

[57] ABSTRACT

To record on a single sheet (9) both a picture image and alphanumeric characters, each character to be recorded is stored (24) in the form of signals representing a multi-column pattern of dots which make up that character. Signals derived in synchronism with the scanning of successive lines on the recording sheet are applied to circuits (19, 20, 23, 25) to derive a column address signal for the character store (24), which is also addressed with a data signal representative of a selected character (32). In this way, signals corresponding to a selected column of the required character are taken from store and are applied to a selector circuit which also receives the picture signals and applies either the picture signals or the character signals to the recording head.

8 Claims, 3 Drawing Figures

IMAGE REPRODUCTION EQUIPMENT

This relates to recording on a single recording sheet from both a source of picture signals and a source of signals representing standard characters, such as alphanumeric characters.

According to the invention, such recording is effected by storing for each character to be recorded data defining a multi-column pattern of dots which make up that character in the recorded image, causing a recording head to scan a recording surface in a succession of parallel lines, addressing the character data store with a coded data signal representative of a selected character and with a column address signal generated in synchronism with the line scanning of the recording surface and defining a required column of dots for the selected character; and, during the scanning of the recording surface, applying to the recording head both a signal representing the picture data for the line which is being recorded and a signal derived from the store in accordance with the said character-selecting signals and column address signal and representing the dot pattern for the required column of the selected character. The invention also relates to apparatus for carrying the said method into effect.

In the preferred form, the apparatus also serves for register mark generation, the register mark data being stored in a separate store; the character store and the register mark store are addressed in parallel with a binary signal of which one digit serves to select one store or the other.

The register mark may occypy a single picture element in a single scanning line.

In order that the invention may be better understood, one example of apparatus embodying the invention will now be described with reference to the accompanying drawings, in which.

Figure 1:
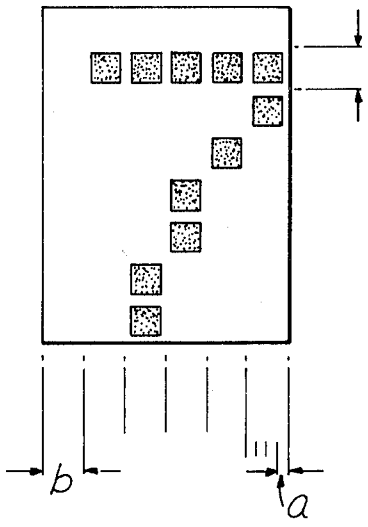
FIG. 1 illustrates a character recorded by a method embodying the invention.

In FIG. 1, the numeral 7 is represented by dots in an $8\times6$ matrix. For this numeral, only five columns are used and only seven rows. In this example, if a scanning pitch of 200/inch is in use (each scanning line being $\frac{1}{8}$ mm wide) four scanning lines, each of width a, are required to reproduce one character dot, the dot occupying a column of width b. In a similar way, in each such scanning line the dot length is equal to four picture elements. At scanning pitches of 400 and 600 lines/inch, eight and twelve lines respectively are required for each dot of the character.

In the apparatus which is to be described register marks are recorded in addition to the alphanumerical characters. For register marks, a finer resolution of the dot pattern is required. For this reason a larger memory store is used, giving a dot size of approximately $\frac{1}{8}$ mm.

Figure 3:
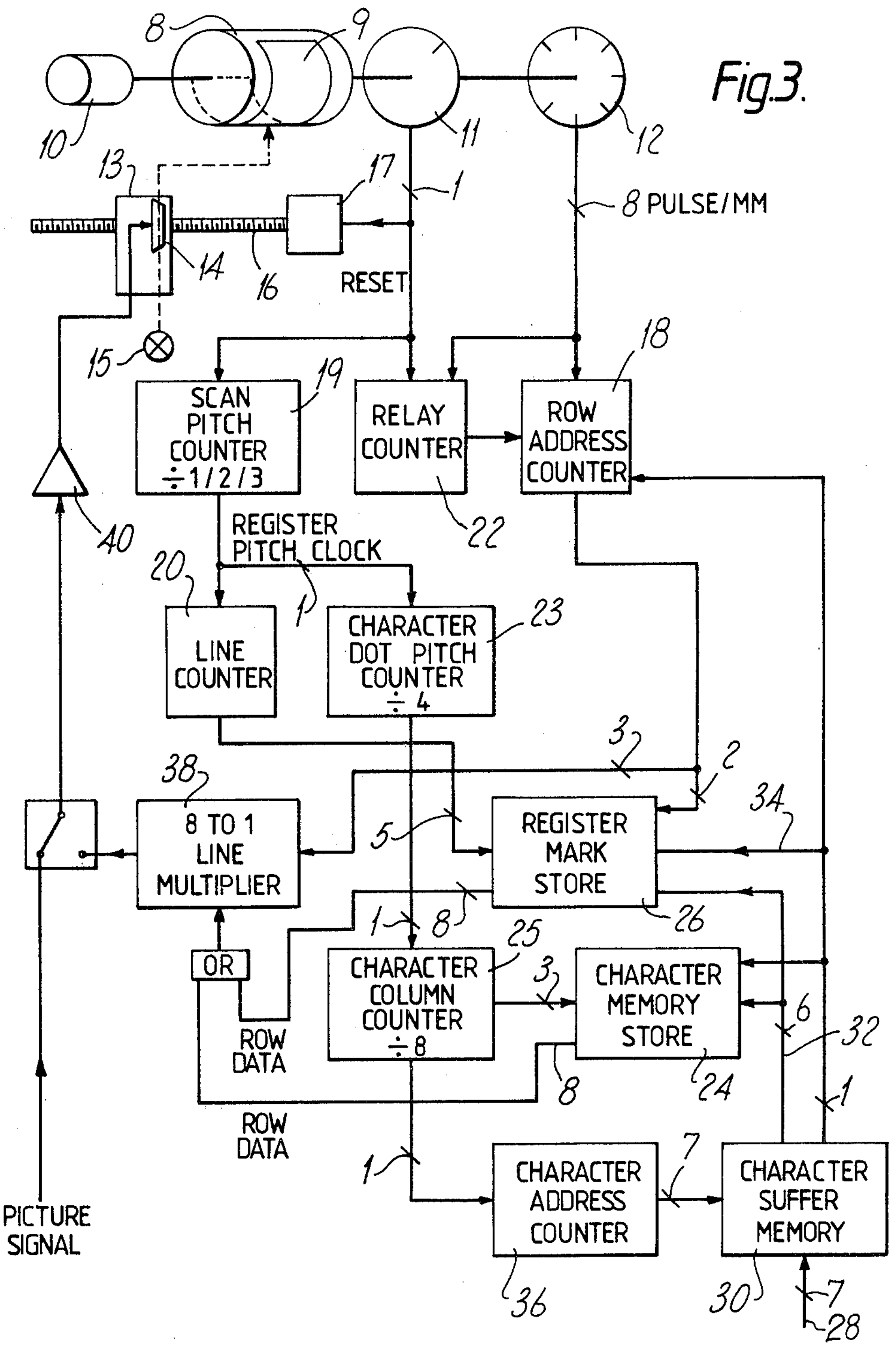
FIG. 3 illustrates apparatus for carrying the method embodying the invention into effect.

Turning now to FIG. 3, an exposing drum 8, carrying a photosensitive sheet 9, is rotated by a motor 10. On the same shaft are two discs, a first disc 11 providing a signal once in each revolution of the drum, and a second disc 12 constituting an incremental encoder providing eight clock pulses per millimeter of drum circumference. A recording head 13 comprising a modulator 14 and a light source 15 is mounted on a lead screw 16 rotated by a driving unit 17 under the control of pulses from the disc 11. The pulses from the incremental encoder are counted in a row address counter 18. The pulses from the disc 11 are passed through a scan pitch counter 19 which has no effect on the pulse rate for a scanning pitch of 200 lines/inch and divides by two and three respectively for scanning pitches of 400 and 600 lines/inch. The pulses from the counter 19 are counted in a line counter 20. They are also applied to a character dot pitch counter 23 with a division of four. The circuit 23 provides one pulse every 4 lines (at 200 lines per inch); thus it provides one pulse for each dot-width or character column of travel of the recording head. These column address pulses are applied to a character column counter 25. The counter 25 supplies the memory 24 with a 3-bit signal representing the column address and also divides the incoming pulses by eight to supply to a character address counter 36 a pulse for each completed character width. In fact, the character width is only 6 columns, the remaining twolines being used for spaces between characters.

A delay counter 22 also receives the pulses from the disc 12, as well as the reset pulses derived from the disc 11.

Data representing the dot patterns which define all the characters which may be required is stored in a character memory store 24, each character being represented by signals corresponding to points defining the character in a matrix of rows and columns. Register mark data is stored in a store 26.

Figure 2:
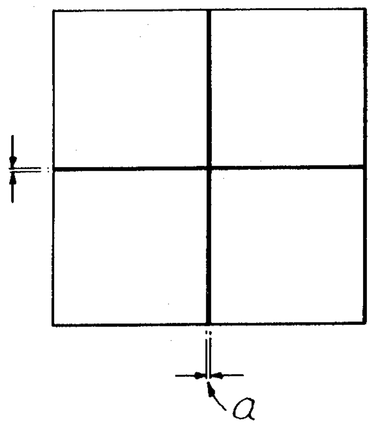
FIG. 2 shows a register mark recorded to the same scale as the character of FIG. 1.

Seven-bit signals provided on a character data bus 28 define each required character (or register mark) in turn. The signals are temporarily stored in a character buffer store 30. From the store a 6-bit address signal is applied by way of line 32 both to the character memory store 24 and the register mark store 26. This enables the selection of one of up to 64 characters in the character memory store and can also be used to select one of 64 register mark "characters" although only one form of register mark is shown in FIG. 2 and only this mark and a "negative" thereof are used in the system which is being described.

A further 1-bit signal on line 34 is used as a switching bit to call up alphanumeric or register mark data from their respective stores. This bit is also applied to the row address counter 18 for use in the selection of different row and line counting rates, in particular to change the address when switching from character to register mark information.

The character address signal applied to the store 24, and the column address signal from the column counter 25, also applied to the store 24, together select signals corresponding to the required column of a dot pattern corresponding to the required character. It will be appreciated that for each revolution of the drum, a single column of each of a large number of dot patterns is selected, and this selection continues through a number of scanning lines until this column is complete. The remaining columns of the same characters are then selected in succeeding revolutions of the exposing drum; again, to complete each column a number of scanning lines is necessary.

The delay counter 22 sets the physical position of the characters around the drum circumference. It is reset to zero in each revolution by the reset pulses derived from the disc 11. It then counts the grating line pulses from the incremental encoder disc 12 until a preset value is reached. This preset value represents the point determined for the character information to be output on to film. At this point the row address counter 18 is enabled, and one line of character dot data is output on to film.

The character address counter 36, fed from the character column counter 25, steps the selection of characters from the buffer memory 30. This counter thus controls character positions horizontally along the drum.

The register mark store 26 is similarly addressed, except that a higher resolution is required because the mark can be anywhere in the matrix. For this reason, the store 26 receives a 5-bit line address signal from line counter 20 and a 2-bit row address signal from counter 18.

Eight-bit signals from the store 24 or the store 26 (whichever is selected) are multiplexed into serial form by an 8-to-1 line multiplexer 38, the output signals from which are combined with the analogue picture signal; following amplification in an amplifier 40, the resulting signal is applied to the modulator 14 to control the intensity of the light beam reaching the recording sheet 9.

The characters exposed on to the recording surface on the exposing drum may, for example, represent a trade house name to be present in the final reproduction or may represent information for an operator responsible for preparing the final reproduction. As an example, these characters could be used to identify three colour separations by printing on them "cyan", "magenta" and "yellow", respectively; or they may record the settings of various controls on the apparatus by means of which the colour separations were made. Problems can exist where separations are not properly identified. For example at the printing stage considerable expense can be involved in rectifying and/or having a to reproduce prints which have been produced from the wrong separations. The use of the present invention can obviate these problems.

It will be appreciated that in FIG. 3, the supply of trains of analogue picture signals, each train corresponding to one line of the original, is synchronised with the rotation of the drum 8, and that the supply of character-coded signals to the buffer memory 30 is similarly synchronised with the drum rotation.

I claim:

1. A method of recording on a single recording sheet, including recording at a first resolution from a source of picture signals and recording at a second and coarser resolution from a source of signals representing dot-matrix characters, comprising the steps of:

storing, for each dot-matrix character to be recorded, data defining a pattern of dots which make up that character;

scanning a recording surface with a recording head in a succession of parallel lines;

generating scan line address signals in synchronism with the line scanning of the recording surface;

dividing the scan line address signals in accordance with the ratio of the resolution of the picture recording to the resolution of the character dots to obtain a character column address signal;

addressing the character data store with a data signal representative of a selected character and with the character column address signal to obtain signals representing a required column of elements, each forming part of a dot of a selected character lying on that scan line, and repeating the signal representing the said column of dot elements in successive scanning lines until the character column address signal is incremented, indicating completion of the dot;

and, during the scanning of the recording surface, applying to the recording head both a signal representing the picture data for the line which is being recorded and a signal derived from the character store in accordance with the said character-selecting signal and character column address signal and representing the dot elements for the required column of a dot of the selected character.

2. A method in accordance with claim 1, for preparing on recording surfaces a set of colour separations of a coloured original, each carrying characters identifying the colour component which it represents.

3. A method in accordance with claim 2, including recording a register mark on each colour separation at a resolution finer than the resolution of the dot matrix characters, comprising storing data defining the register mark and addressing the register mark stored with a signal generated in synchronism with the line scanning of the recording surface to obtain a signal representative of the register mark, and during the scanning of the recording surface applying to the said recording head the signal derived from the register mark store.

4. A method of preparing on recording surfaces a set of colour separations of a coloured original, each carrying characters identifying the colour component which it represents, comprising the steps of:

storing, for each character to be recorded, data defining a multi-column pattern of dots which make up that character in the recorded image;

for each colour separation, causing a recording head to scan a recording surface in a succession of parallel lines;

addressing the character data store with data signals representative of each selected character required in the colour component identification and with a column address signal generated in synchronism with the line scanning of the recording surface and defining a required column of dots for the selected character;

and, during the scanning of the recording surface, applying to the recording head both a signal representing the picture data for the line which is being recorded and a signal derived from the store in accordance with the said character-selecting signal and column address signal and representing the dot pattern for the required column of each selected character, whereby the colour component represented by each colour separation of the set is identified on that separation.

5. A method in accordance with claim 4, for additionally recording on the recording sheet a register mark occupying a fraction of the area occupied by a standard character, comprising storing data defining register marks and addressing the register mark store with a coded data signal representative of the required register mark and with an address signal generated in synchronism with the line scanning of the recording surface and defining the line in which the register mark is to be recorded;

and during the scanning of the recording surface, applying to the said recording head the signal derived from the register mark store, whereby each colour separation carries a register mark in addition to its colour-component identification.

6. A method of recording on a single recording sheet from both a source of picture signals and a source of signals representing standard characters, comprising the steps of:

storing, for each character to be recorded, data defining a multi-column pattern of dots which make up that character in the recording image;

causing a recording head to scan a recording surface in a succession of parallel lines;

addressing the character data store with a data signal representative of a selected character and with a column address signal generated in synchronism with the line scanning of the recording surface and defining a required column of dots for the selected character;

storing data defining a register mark occupying a fraction of the area occupied by each of the standard characters, addressing the register mark store with a coded data signal representative of the required register mark and with an address signal generated in synchronism with the line scanning of the recording surface and defining the line in which the register mark is to be recorded;

and, during the scanning of the recording surface, applying to the recording head both a signal representing the picture data for the line which is being recorded, a signal derived from the store in accordance with the said character-selecting signal and column address signal and representing the dot pattern for the required column of the selected character, and the signal derived from the register mark store.

7. Apparatus for recording on a signal recording sheet, including recording at a first resolution from a source of picture signals and recording from a source of signals representing dot-matrix characters with a dot width equal to a mulitple of the picture scanning line width comprising:

a recording scanner having a recording head to which signals for recording are applied;

a source of picture signals for application to the recording head;

a store of signals representing dot-matrix characters, each character being represented by a set of signals which correspond to the dots in a character-representing matrix;

a source of signals defining the required characters, connected to address the store of characters with coded data signals representative of the selected characters;

means controlled in synchronism with the operation of the recording scanner to generate a column address signal corresponding to the line scanning of the recording surface;

means operative to divide the column address signal by a predetermined number equal to the required number of columns in a character dot and to apply the resulting character dot-width column address signal to the character data store;

and means applying to the recording head, during the scanning of the recording surface, both signals representing the picture data and signals derived from the character data store.

8. Apparatus in accordance with claim 7, for additionally recording reference marks with a resolution equal to the picture resolution, further comprising a store of signals representing reference marks, each mark being represented by a signal or signals corresponding to the point or points in a matrix of rows and columns; a source of signals defining required reference marks, connected to address the reference marks store; means applying the column address signal to the register mark store;

and means whereby the recording head receives, during the scanning of the recording surface, reference mark signals in addition to the picture signals and the signals derived from the character data store.

* * * * *